US 6,655,631 B2

(12) United States Patent
Austen-Brown

(10) Patent No.: US 6,655,631 B2
(45) Date of Patent: Dec. 2, 2003

(54) PERSONAL HOVERPLANE WITH FOUR TILTMOTORS

(76) Inventor: John Frederick Austen-Brown, 542 Armand Frappier, Valleyfield, Quebec (CA), JGT 5J5

( * ) Notice: Subject to any disclaimer, the term of this patent is extended or adjusted under 35 U.S.C. 154(b) by 1 day.

(21) Appl. No.: 10/201,979

(22) Filed: Jul. 25, 2002

(65) Prior Publication Data

US 2003/0094537 A1 May 22, 2003

Related U.S. Application Data

(60) Provisional application No. 60/307,654, filed on Jul. 26, 2001.

(51) Int. Cl.[7] ............................................... B64C 29/00
(52) U.S. Cl. ........................................ 244/12.4; 244/56
(58) Field of Search ............................. 244/12.4, 12.3, 244/23 D, 7 R, 17.23, 56, 66, 6

(56) References Cited

U.S. PATENT DOCUMENTS

| 3,089,666 | A | * | 5/1963 | Quenzler | ...................... 244/56 |
| 3,165,280 | A | * | 1/1965 | Shao-tang Lee | ............. 244/56 |
| 4,093,155 | A | * | 6/1978 | Kincaid, Jr. | ................ 244/12.4 |
| 5,096,140 | A | * | 3/1992 | Dornier, Jr. et al. | ....... 244/12.4 |
| 5,419,514 | A | * | 5/1995 | Ducan | ........................ 244/12.4 |
| 5,709,357 | A | * | 1/1998 | Von Wilmowsky | ........... 244/56 |
| 6,030,177 | A | * | 2/2000 | Hager | .......................... 244/56 |

* cited by examiner

Primary Examiner—Galen L. Barefoot

(57) ABSTRACT

A vertical take-off and landing aircraft having a wing fitted, in the preferred embodiment, with two nacelles one port and one starboard, each nacelle having two tiltmotors in tandem, one forward and one aft of the wing. A conventional rudder and high set tailplane is fitted or, in another embodiment forward canards or in yet another embodiment the aircraft is a flying wing.

Forward tiltmotors can be tilted up past the vertical and the aft pusher tiltmotors can be tilted down past the vertical so that the aircraft can maintain a steep descent with the propeller discs horizontal and a low angle of attack of the wing.

Each engine is fitted with a two bladed variable pitch propeller that feathers to stop vertically, other embodiments have cyclic pitch propellers. The tiltmotors, have a sideways cant in the tilted positions to reduce engine side loads in translation.

All the tiltmotors are equipped with emergency electric motors that can be used to shift the center of lift in hover and assist in gust control.

A small wing is provided with very large flaps that are moved in synchronization with the tiltmotors to allow a clear downdraft and also act as a dive brake.

A tricycle undercarriage has long nacelle legs to provide ground clearance for the aft propellers and is equipped with side-load sensors for weathercock control.

An auto-pilot controls all phases of flight and has a manual back-up control system.

Special programs control weathercock effects on landing and take-off, and operation of the emergency electric motors.

12 Claims, 17 Drawing Sheets

PERSONAL HOVERPLANE
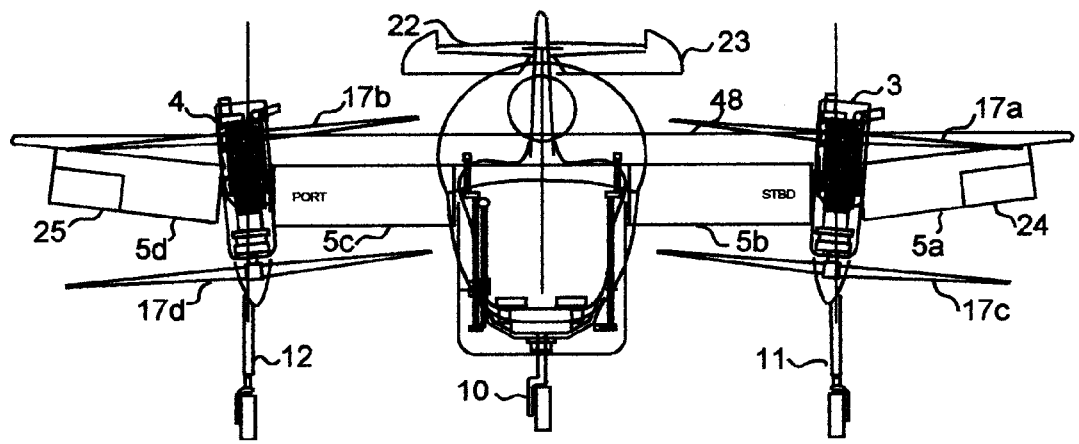
Fig 5
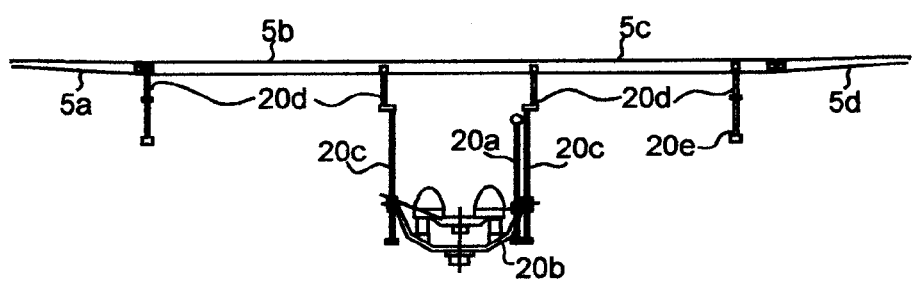
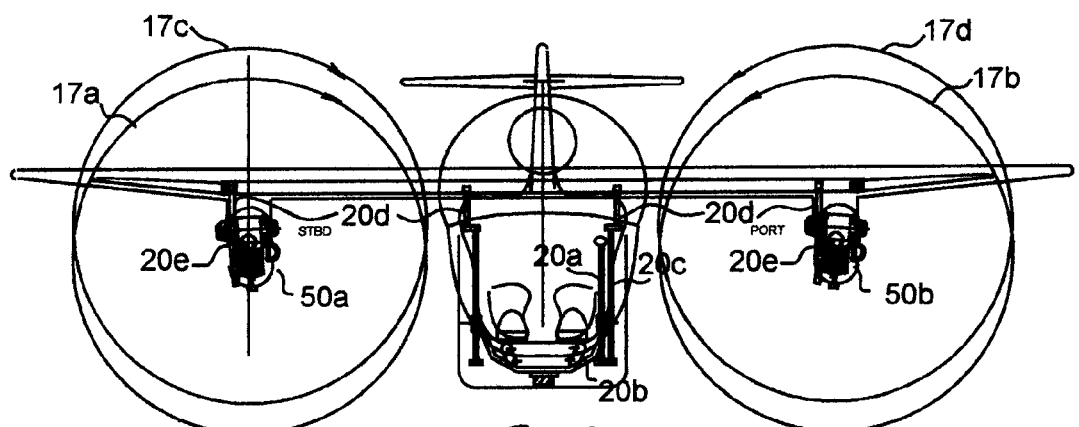
Fig 6

PERSONAL HOVERPLANE

PERSONAL HOVERPLANE

PERSONAL HOVERPLANE

PERSONAL HOVERPLANE

PERSONAL HOVERPLANE

PERSONAL HOVERPLANE

Weights by group - about CG - METRIC UNITS

| id dwg no | title | mass | xbar | ybar | zbar | xgyr | ygyr | zgyr |
|---|---|---|---|---|---|---|---|---|
| 10000 | powerplant fwd stbd | 30.000 | -0.629 | 0.832 | -0.007 | 0.100 | 0.125 | 0.115 |
| 20000 | powerplant fwd port | 30.000 | -0.629 | -0.832 | -0.007 | 0.100 | 0.125 | 0.115 |
| 30000 | powerplant aft stbd | 30.000 | 0.814 | 0.832 | 0.077 | 0.100 | 0.125 | 0.115 |
| 40000 | powerplant aft port | 30.000 | 0.814 | -0.832 | 0.077 | 0.100 | 0.125 | 0.115 |
| 50000 | fuselage fwd | 32.000 | -0.609 | 0.000 | 0.020 | 0.300 | 0.500 | 0.400 |
| 60000 | fuselage aft | 18.000 | 0.416 | 0.000 | -0.060 | 0.250 | 0.750 | 0.750 |
| 70000 | equipment | 14.000 | 0.116 | 0.000 | -0.080 | 0.150 | 0.900 | 0.900 |
| 80000 | nacelle stbd | 12.000 | 0.116 | 0.832 | 0.050 | 0.080 | 0.450 | 0.450 |
| 90000 | nacelle port | 12.000 | 0.116 | -0.832 | 0.050 | 0.080 | 0.450 | 0.450 |
| 100000 | tilt system | 15.000 | -0.184 | 0.000 | 0.020 | 0.750 | 0.800 | 0.120 |
| 110000 | instrument panel | 3.000 | -0.734 | 0.000 | 0.020 | 0.100 | 0.040 | 0.100 |
| 120000 | pilot and baggage | 100.000 | -0.244 | 0.000 | -0.080 | 0.150 | 0.400 | 0.400 |
| 130000 | gear fwd up | 3.000 | -1.134 | 0.000 | -0.230 | 0.050 | 0.150 | 0.150 |
| 140000 | gear nacelles up | 8.000 | -0.034 | 0.000 | 0.020 | 0.850 | 0.250 | 0.900 |
| 150000 | wing | 25.000 | 0.066 | 0.000 | 0.180 | 0.980 | 0.110 | 0.990 |
| 160000 | flap | 8.000 | 0.316 | 0.000 | 0.180 | 0.980 | 0.110 | 0.990 |
| 170000 | tailplane | 2.000 | 1.416 | 0.200 | 0.482 | 0.230 | 0.050 | 0.240 |
| 180000 | elevator | 2.500 | 1.616 | 0.000 | 0.482 | 0.230 | 0.050 | 0.240 |
| 190000 | fin | 4.000 | 1.346 | 0.000 | 0.270 | 0.160 | 0.160 | 0.140 |
| 200000 | rudder | 1.200 | 1.616 | 0.000 | 0.170 | 0.250 | 0.260 | 0.030 |
| 210000 | bulkheads | 5.500 | -0.184 | 0.000 | -0.100 | 0.170 | 0.500 | 0.510 |
| 220000 | fuel and tank | 51.300 | 0.216 | 0.000 | -0.080 | 0.100 | 0.180 | 0.180 |

Total mass, moment and C.G data for groups

| Mass | Xbar | Ybar | Zbar | Xcg | Ycg | Zcg | about CG |
|---|---|---|---|---|---|---|---|
| 436.500 | -1.086 | 0.400 | 0.409 | -0.002 | 0.001 | 0.001 | |

Inertias about C.G. axes

| Ixxcg | Iyycg | Izzcg |
|---|---|---|
| 261.5824 | 266.1162 | 336.0601 |

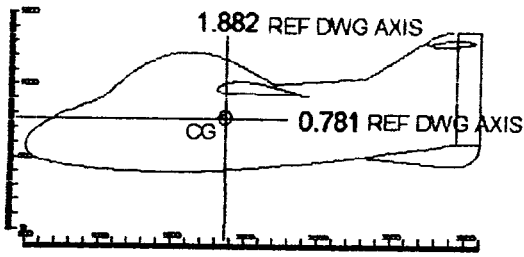

Fig 17

INVENTOR
J. F. Austen-Brown

PERSONAL HOVERPLANE

PERSONAL HOVERPLANE
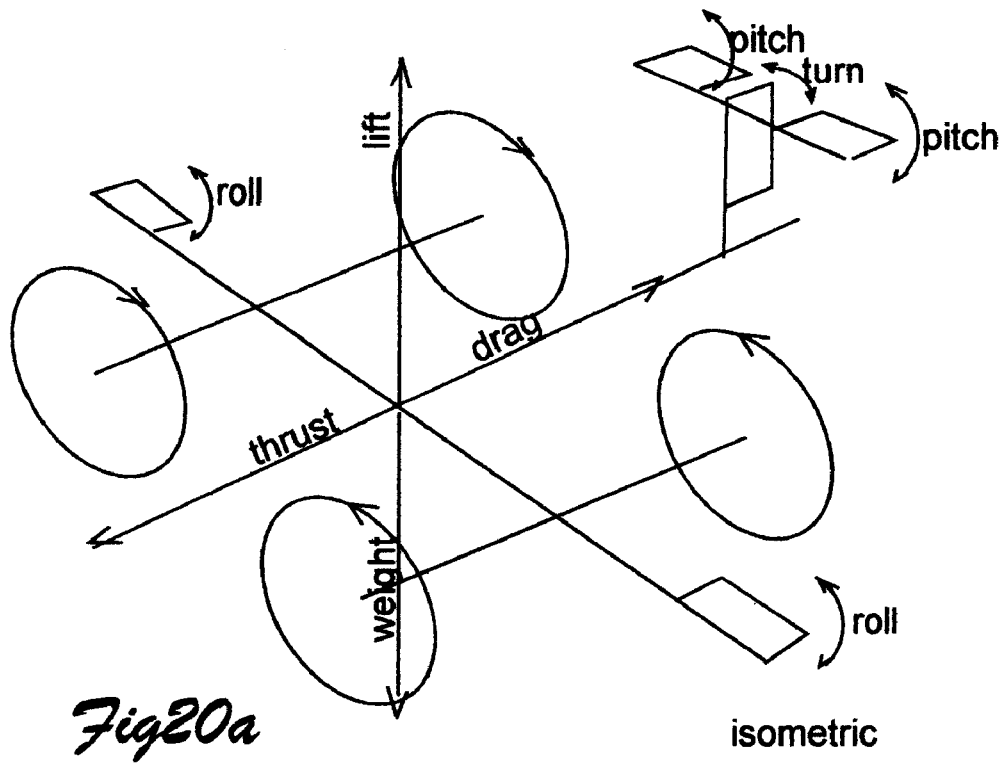
Fig 20a    isometric
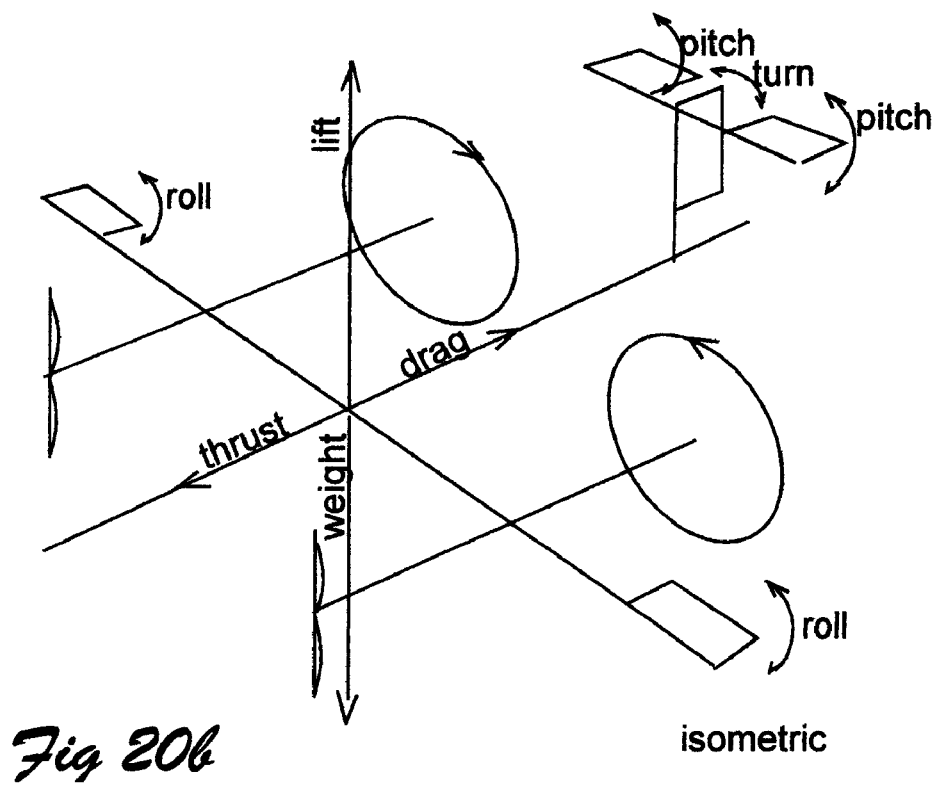
Fig 20b    isometric

PERSONAL HOVERPLANE
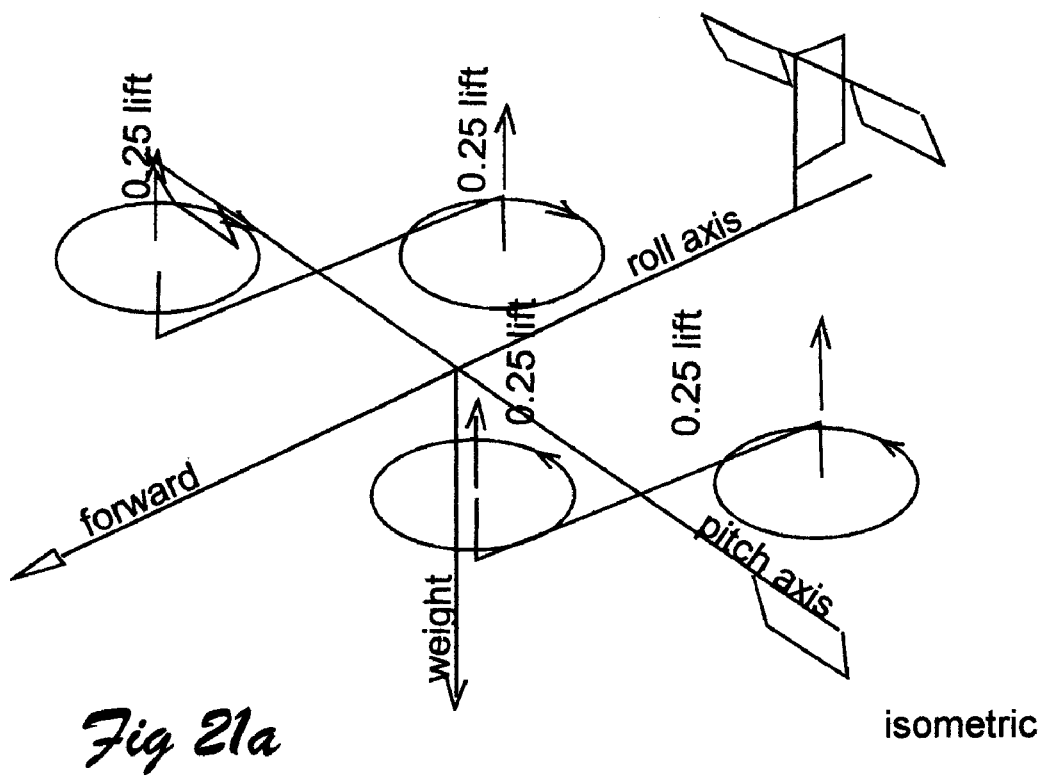
Fig 21a                                    isometric
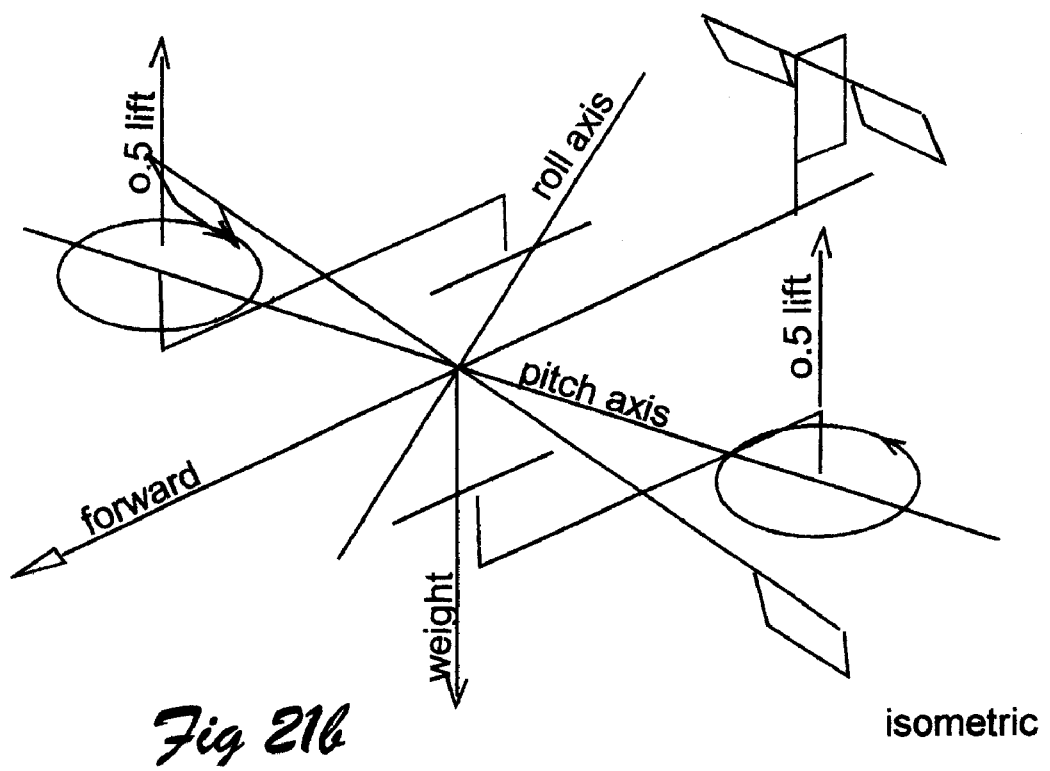
Fig 21b                                    isometric

PERSONAL HOVERPLANE

PERSONAL HOVERPLANE WITH FOUR TILTMOTORS

This application claims the benefit of provisional application Ser. No. 60/307,654 filed Jul. 26, 2001.

SPECIFICATION

This invention relates to a VTOL aircraft having a plurality of motors about the wing that are tiltable to provide a hovering capability in a level position or a steep nose down attitude. It relates in particular to an improved aircraft with large flaps for steeper descent, feathering propellers, canted engines, provision for tilt past the vertical, emergency motors usable for gust and attitude control and special landing gear with weathercock control. Full automatic and manual systems are included.

NATURE

Previous art described by Quenzler has a VTOL aircraft of this class with interconnected nacelle mounted tiltmotors upon a wing that has high lift devices to aid in maintaining aerodynamic control in translational flight. The Turner description uses the same lift principle but with two tip mounted tilt rotors.

The Quenzler types have crosswise interconnected engines with extra weight and transmission losses and no emergency power system. With eight or more tiltmotors they do not need engine interconnection or an emergency power system, but have added maintenance requirements, they would be more suitable with electric power.

The nature of VTOL aircraft with two tiltmotors as described by Turner is such as to require large rotors with cyclic pitch, engine interconnecting shafts and gearboxes, involving greater rotor complexity and expense. The large rotors at the wing tips cause laterally uneven ground effect in side gusts as one wing receives an increased ground reaction while the other wing a decreased reaction. Such rotors also present a comparatively large foreign object target in flight as typified in the Bell-Boeing V22 Osprey and the smaller Bell Eagle eye UAV.

The two tiltmotor class also has less positive pitch control in hover than the four tiltmotors of the Quenzler description, and requires specialized flaps and stringent weight control for even greater expense. Power on one engine involves shaft power losses. The overall span is roughly twice that of the four tiltmotor. Roll inertia is high. High speed versions require a two speed gearbox or variable diameter rotor to reduce tipspeed. The Dornier rotor diameters are marginally less than the V22.

The Wechsler tiltrotor is similar to the Turner but has contra-rotating propellers. these also reduce the diameter slightly to lower the tipspeed at high speed, but at a great cost in complexity, weight and even further expense than in V22 examples.

The Wilmowski tandem tiltrotor with large rotors fore and aft of the fuselage has the disadvantage that in hover the fuselage is in the forward rotor downwash and in level flight the forward rotor represents a huge obstruction to forward view from the cockpit also there could be considerable drumming due to the shockwaves of the forward rotor slipstream against the cockpit and fuselage side. The rotor span is about the same as for the four rotor Quenzler types. The design is more efficient if the forward rotors could feather for cruise, with all power to the rear rotors.

The Lariviere canard with two large boom mounted propellers between the fixed flying surfaces requires a heavy and highly stressed fuselage, giving higher inertia about the lateral axis than the Turner description and less maneuvrability especially if the fuel is forward and aft of the engine. The wing has no flaps to reduce descent speed. The fat fuselage, booms and wing pylons have high drag.

The tiltwing class such as the Canadair CL84 and Ishida TW68 with two motors and the XC-142A with four motors cannot use high lift devices as are used in the class with two tiltmotors and have tail rotors to improve pitch control in translational flight, again with gearboxes, shafting, power losses, complexity and expense. All defunct, they had however, better performance than the V22 Osprey. V44 and tandem tiltwings have higher drag, mass and inertia than the hoverplane.

The Boeing Heliwing and earlier tailsitters such as the Convair contra-prop XFY-1 and jet Ryan X-13, which avoid the tiltwing mechanism, together with jet flaps, deflecting flaps and other systems have all been abandoned nevertheless. They all lacked driveway maneuvrability, especially in gusty conditions.

The Moller types have a low efficiency lift system and a high drag lifting body fuselage plus high nacelle drag and interference drag. They are designed to be roadable vehicles, are expensive and have eight motor maintenance.

The Rutherford tipjet rotorwing requires specialized gas turbine engines and for safety two of them, feeding ducted, gimballing, teetering, tip driven and variably damped rotors. A personal aircraft would be too large and extremely expensive.

The above describes the prior art upon which the hoverplane invention provides improvement, the ability to descend quickly without undesirable forward accelerations, the smaller size, light weight, steady platform and greater agility necessary to a personal aircraft able to land in driveways at lower cost with four engine safety. The hoverplane is the first practical personal aircraft.

INVENTIVE IDEA

The hoverplane was invented as the result of considering the need to increase the safety of small private airplanes in view of numerous and continuing fatal accidents after nearly 100 years of private flying in aircraft unable to "stop" in the air. The existing helicopter, tiltrotor and tiltwing aircraft were considered too expensive, complex or hard to handle for use as a small private aircraft.

All types of aircraft capable of maneuvers such as slow descent that would reduce accidents were considered, then cost reduction and practical usage studied. It was realized that a small four tiltmotor aircraft could have improved safety features and could slow down and land safely in bad weather or severe icing conditions.

My flying experience with Bristol Brigand aircraft equipped with large dive brakes inflated by ram air, and also with flights in Horsa gliders having very large flaps allowing steep descent and pull-out with rapid deceleration, suggested the means to reduce speed in descent.

To obtain a light, inexpensive hovering machine with the fail-safe quality of being able to hover on two motors, the four tiltmotor arrangement was selected.

Aerodynamic characteristics were explored using models having four tiltmotors. This allowed the stability to be checked and transitional behavior to be studied. The models were flown with and without an autopilot.

A photograph of the model was taken in 1996 while hovering with a motor tilt of 75 deg and the propellers substantially horizontal, when the model remained stationary with a slight turning movement to port (due to engine torque). This is believed to be the first record of an aircraft of this type in hover. The model weighed 15 kilos with two 2 kw engines forward and two 1.5 kw engines aft.

All engines turned anti-clockwise as viewed from the spinner, causing a slight torque asymmetry. Behavior in ground-effect indicated the desirability of autopilot control under this condition for the model.

Tests also showed the need to reduce the angle of attack in descent due to stalling. Any attempt to reduce the angle of attack for descent resulted in an unwanted speed increase.

Another test resulted in accidental descent into trees. A steep nose up angle was adopted with slow descent, only minimal damage was sustained to the tail only. The flight was recorded by camera. The result shows the advantage of small rotors for emergency descent in forests.

As a result of the tests a design for a manned hoverplane was made incorporating the following improvements.

Large flaps to ensure slow and steep descent with the propellers tilted horizontal to the airstream. After take-off the flaps, when unlocked, provide a tilt reducing force as speed increases and vice verse, assisting back-up manual tilt.

Four motors for hovering, able to tilt more than 90 deg to prevent stall in descent by lowering the angle of attack.

Variable pitch feathering propellers or in another embodiment, with additional cyclic pitch control to assist tilt and improve lateral flight control in hover.

Sideways propeller tilt in transition to reduce uneven propeller side loads, providing less wear and maintenance of the hub mechanism.

An emergency power system for each motor, usable under computer control for gust alleviation, to shift the center of lift upward in hover at steep angles, nose up or nose down, and to maintain propeller RPM to balance gyroscopic forces.

A low cost manual control system having linkages that cancel tilt reactions and a throttle system that simplifies manual control in hover. The small propellers allow manual tilt control.

Special autopilot systems able to maintain a stationary hovering position while allowing the machine to weathercock. This is to allow landing with a minimum of reverse airflow over the control surfaces.

A long undercarriage to provide propeller clearance, with a weathercock sensing system. The long legs can also be fitted with inflatable balloons for water landing.

Two engines, preferably the forward engines may be shut down for economical cruise or long duration search.

The combination of overtilt and large flaps confers the advantage that a compact design is possible with improved downdraft about the wing, better handling and less disturbing ground effect. The wing, nacelles, engines and flaps together as a unit can be affixed to any type aircraft whether it is a conventional design, canard or ultra compact flying wing. Detail wing configurations will of course vary.

When the hoverplane was initially designed it was not known that any others had described this four tiltmotor arrangement and a simple low cost design without cyclic pitch propellers was being compared to a sophisticated expensive fly-by-wire system with cyclic pitch and fully autonomous flight.

This machine would have a fundamental difference from the simpler model in that a full six axis inertia system would allow lateral displacements without body tilt and would be suitable for robotic missions, an improvement over the normal helicopter which is hung at the rotor hub and must tilt the rotor before making a lateral displacement and even has reactions to the high mounted tailrotor. It is believed that the hoverplane with cyclic pitch applied to create a steady platform is new.

The hoverplane includes full use of automatic systems and constant flight control to meet the future very high safety standards needed for general use. However this design can be simplified to provide a version having lower cost than any equivalent aircraft able to hover yet cruise at high speed. It would permit life and convenient travel in areas where there are no roads or too many cars.

The design with fully automatic systems serves as the basis to the preferred embodiment A simplified embodiment with manual systems, an embodiment with canard layout and a tailless embodiment are also described. A tailless example with untwisted forward rotors that stop horizontally to act as canards is given.

LIST OF DRAWINGS

In drawings that illustrate the preferred embodiment:

FIG. 5 is a view partly in section from the rear of this embodiment in hover.

FIG. 6 is the same as FIG. 5 from the front in level flight.

FIG. 17 is a listing of the mass properties for the preferred embodiment.

FIG. 20 is a diagram of forces for level flight.

FIG. 21 is a diagram of forces for hovering flight.

DESCRIPTION

The hoverplane improves the personal aircraft by providing hovering capabilities in an affordable machine for point to point residential and business transport services. The previous patents describe heavier and more costly aircraft less able to satisfy the need for a truly personal aircraft.

Figure 1:
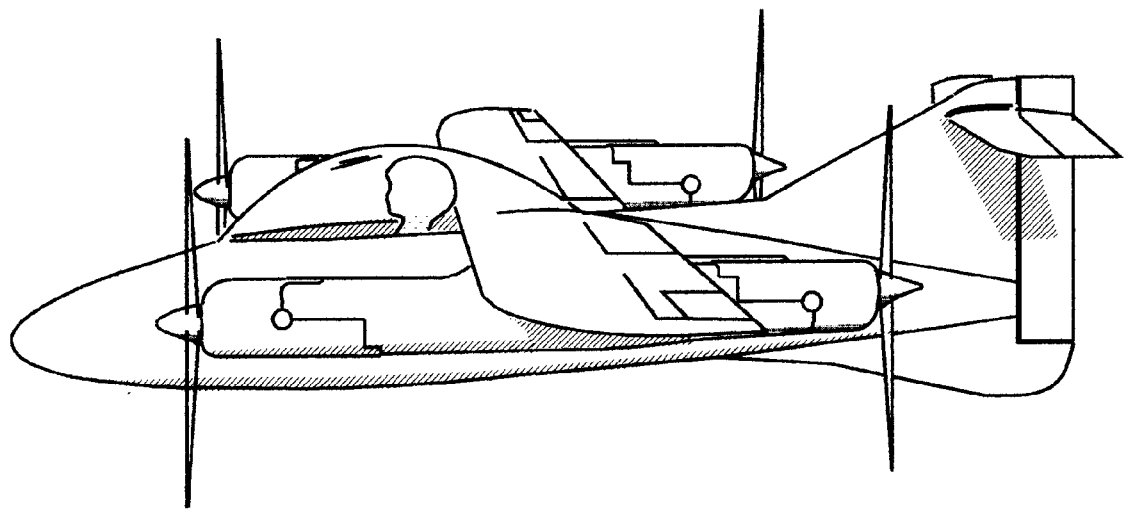
FIG. 1 is a three view sketch of the hoverplane in level flight.

To provide practical landing and take-off capabilities from driveways and back yards the machine must be made as small as possible. FIG. 1 shows a minimum size design weighing only 440 kg with passenger and fuel per the mass breakdown in FIG. 17. Estimated dimensions and performance are as follows:

| | |
|---|---|
| Wingspan | 3.000 m. (with trainer tips 4.5 m) |
| Length | 3.100 m |
| Height max | 1.200 m |
| Wing area | 1.700 m2 |
| Prop diam | 1.000 m |
| Mass total | 440 kg |
| Power main | 120 kw Emerg. 40 kw (one motor 20 kw for 1 minute) |
| Max speed | 360 kmh |
| Range | 1000 km |

The mass breakdown given in FIG. 17 is a preliminary estimate but will indicate that even with the landing gear up the CG is well below the wing and within a normal range. No ballast is required.

A two seat machine involves greatly increased weight, power, noise, dust and air disturbance, and a lower safety margin due to reduced maneuverability.

Essential features as shown for the preferred embodiment in the accompanying drawings are: large flaps 5a–d to ensure slow descent, motors 1–4 able to tilt more than 90 deg to prevent stall in descent by lowering the angle of attack, auto-landing system 6, auto-navigation system 7 and auto-pilot 26a–c with a complete manual override 8, emergency motors 9a–d and special landing legs 10–12. The auto-landing system 6 is able to maintain a stationary position while allowing the machine to weathercock. This to allow landing with a minimum of reverse airflow over the control surfaces. Emergency motors 9a–d permit roll and pitch axes to be maintained, see force diagrams FIGS. 20a,b level flight, 21a,b hover, and 22a,b translational flight.

Figure 2:
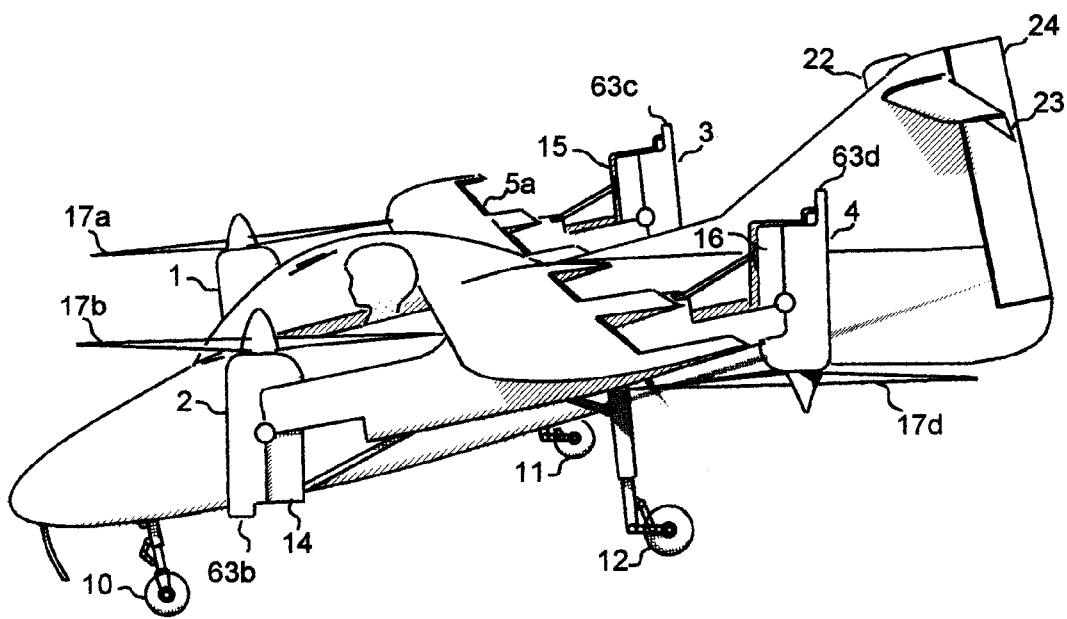
FIG. 2 is the same as FIG. 1 but in hovering flight with legs extended. making a descending turn to port.

Tiltmotor units 1–4 are equipped with four engines 13–16 mounted in two nacelles 50a,50b. The forward engines 13,14 tilt up and the aft engines 15,16 tilt down as shown in FIG. 2, all engines are equipped with two bladed, variable pitch fully feathering propellers 17a–d or alternative cyclic pitch 17i–l, with brakes and means to stop feathered blades vertically so as to reduce their drag when tilted.

Figure 23:
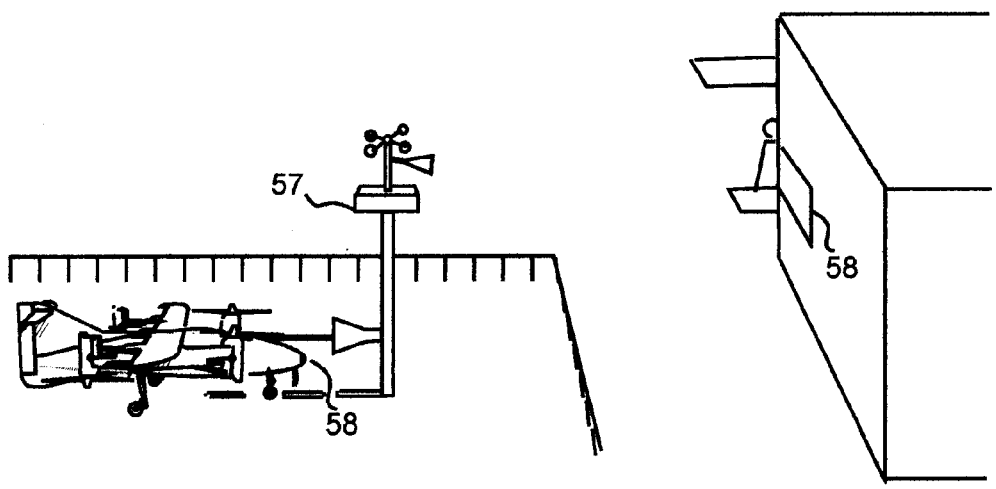
FIG. 23 is a sketch of an emergency motor installation.

Engines 13–16 have clutches 18a–d to allow running with the propellers 17a–d stationary. Emergency electric motors 19a–d act upon the propeller shafts 17e–h, providing short term partial power to support any failing tiltmotor 1–4 and assisting control in low speed emergency landing, each electric motor can supply 20 kw for one minute allowing the diametrically opposite engine to maintain another 20 kw for the landing. The engine clutch 18a–d is automatically disengaged and the blades unfeathered, if this emergency motor is activated, see FIG. 23. A program in the auto-landing system 6 controls the emergency system.

Figure 3:
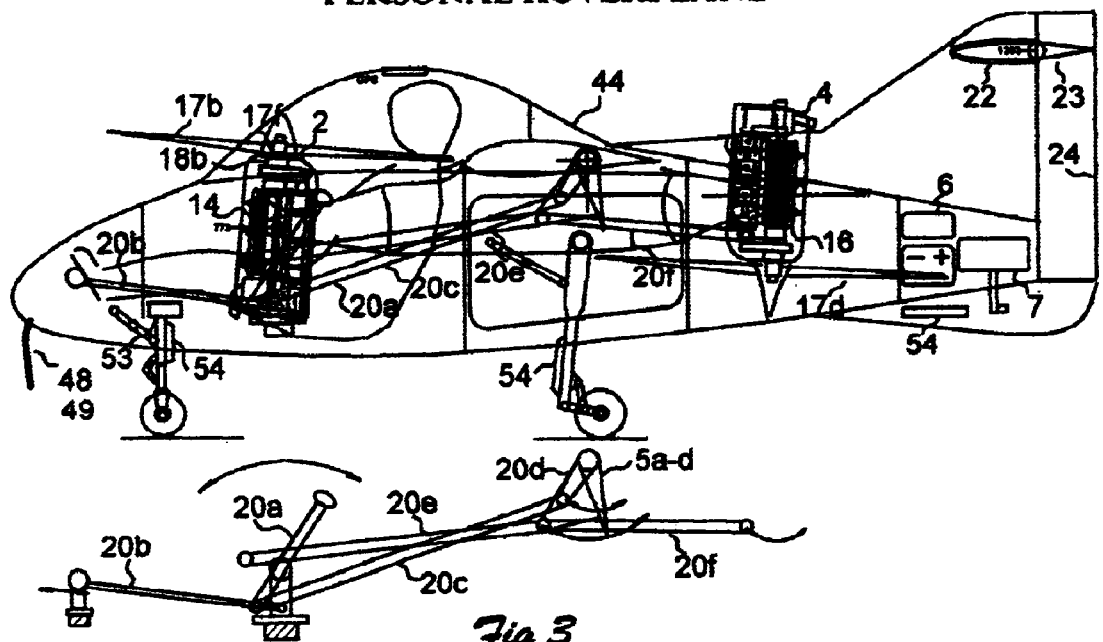
FIG. 3 is a side elevation partly in section of this embodiment in hover.
Figure 4:
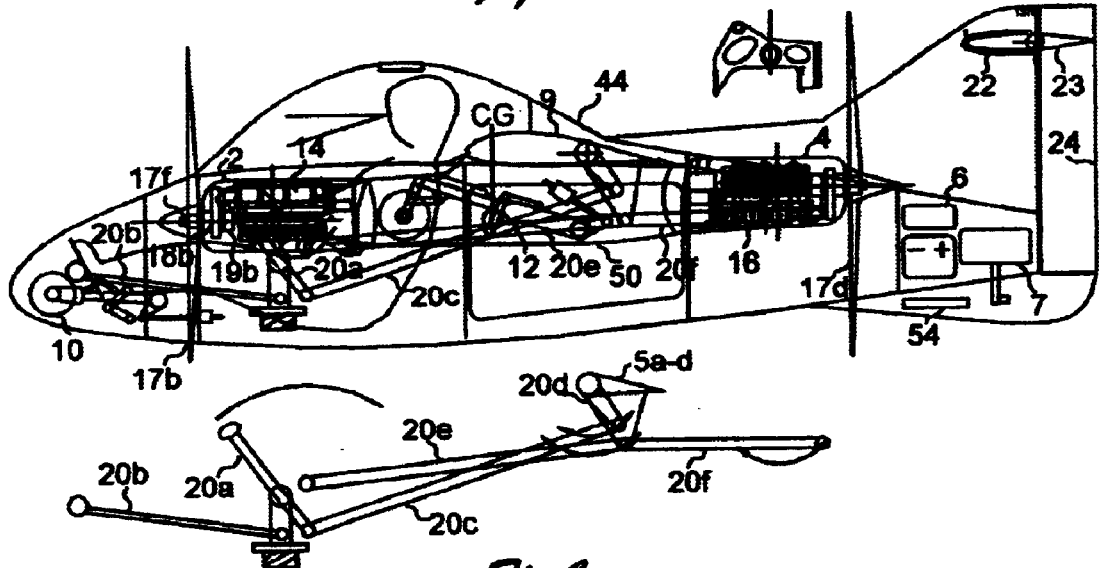
FIG. 4 is the same section as in FIG. 3 in level flight.
Figure 7:
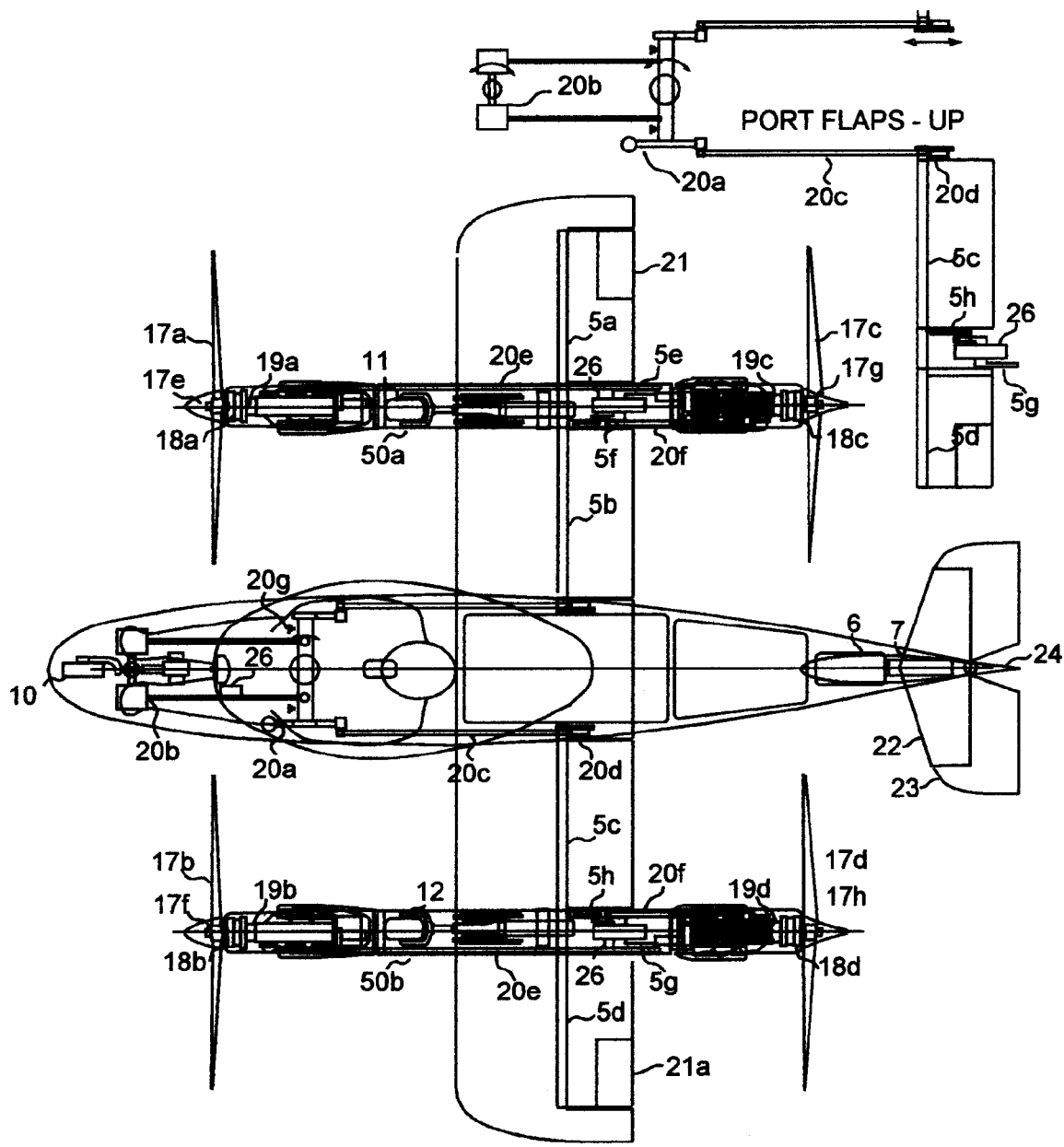
FIG. 7 is a plan view partly in section of this embodiment in level flight.
Figure 8:
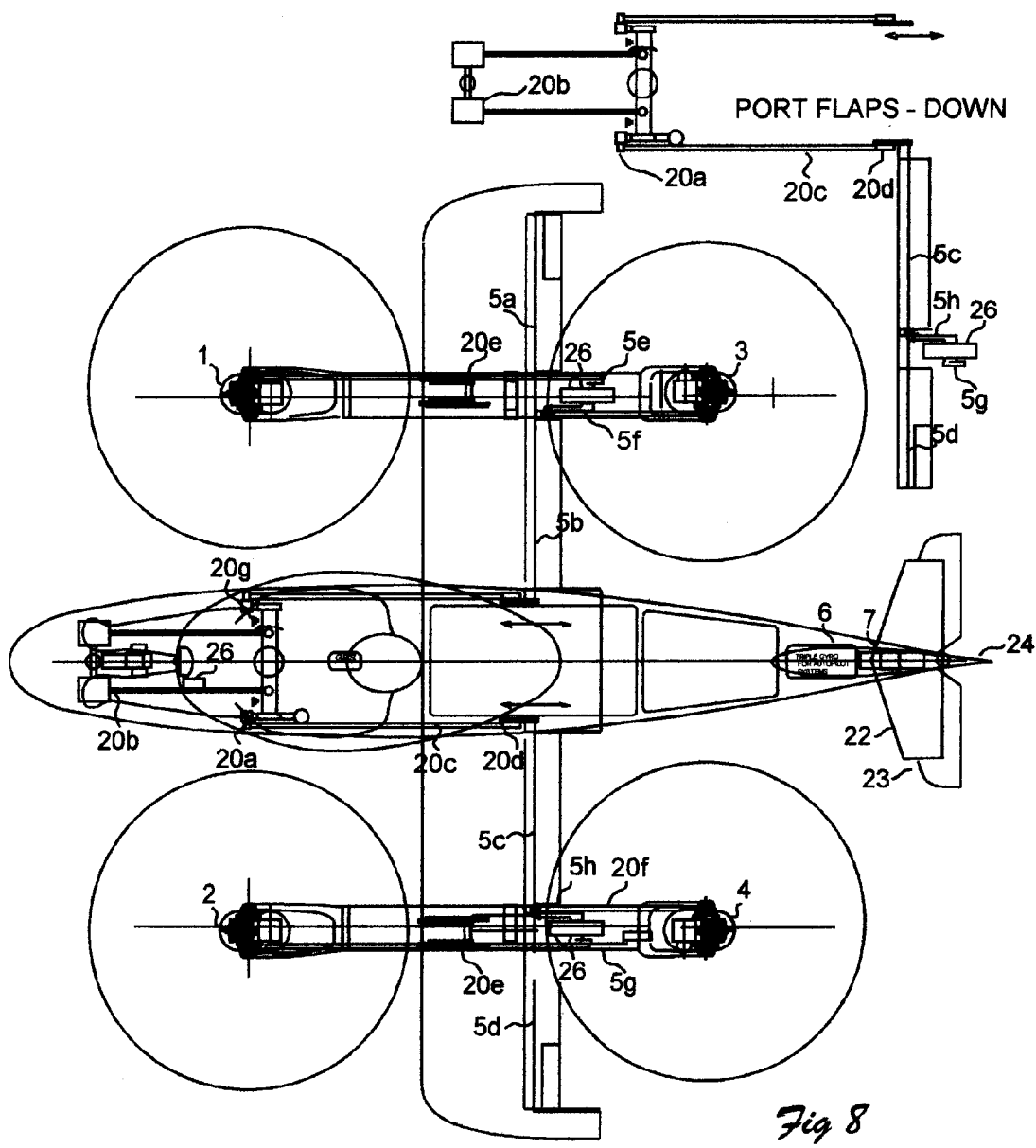
FIG. 8 is the same plan view as FIG. 7 in hover.

Aerodynamic flight controls have a high tailplane 22 and elevator 23 to avoid the slipstream in cruise flight, and with the ailerons 21,21a fitted to the outer flaps 5a,5d and the rudder 24, provide manual control in conventional flight. The flaps 5a–d have control arms 20d connected to the engines 13–16 via the control rods 20c,e,f and torsion tubes 5e–h shown in FIGS. 3 and 7. and as speed falls below the stall, the engines 13–16 are tilted and flaps 5a–d extend providing an increased lift/drag component that reduces in proportion to the square of the airspeed.

Tiltmotors port and starboard are tilted equally for straight transitional and hovering flight, a footbar 20b for asymmetric tilt control allows heading changes at slow speed. Thus a degree of manual weathercock control is assured.

The auto-landing system 6 controls the tilt control column 20a, footbar 20b, three-axis stick 27, propellers 17a–d and master throttle 28 driving the appropriate throttles 29–32 and flight controls 21–25 for vertical, lateral and horizontal control.

Manual control is effected by the three-axis stick 27, master throttle 28, pitch lever 39, landing gear 40, tilt column 20a and footbar 20b.

For slow speed flight the engine/flap position is set to the optimum for minimum stall speed, approximately 40% tilt and 30% flap. At very low speeds four engines 13–16 must be in operation. The auto-landing system 6 unfeathers propellers and starts stopped engines as necessary in this very low speed range.

Loitering flight can be made with the forward engines 13,14 stopped and their propellers 17a,17b feathered and stopped vertically, giving maximum economy with quiet flight. Tilt angle can be set automatically by the autopilot system 26. This is a pleasant advantage of the hoverplane concept, increasing both the flight range and endurance for search and rescue or long missions.

Engines 13–16 that are light, reliable and have a small frontal area are important to allow the performance required for a personal aircraft. To illustrate this the example design includes 3 cyl. in-line engines, or wankel engines as in the tailless version FIG. 16 This class of machine may use future small gas turbine or fuel cell electric systems with increased reliability and performance. At this date these types of engine are neither cheap nor available for the mass market and services.

Small size and lightness affect the utility of the hoverplane in the same sense that the single seat bicycle is universally used instead of multi-seat versions because it is easier to handle and park. However multi-seat versions of the hoverplane are entirely possible as family machines for those who can afford them and provide a personal hoverpad. They would be suitable as company or emergency vehicles.

The hoverplane can be flown manually and as a normal aircraft without tilt, a small airfield with an asphalt runway is sufficient. This allows pilots to gain familiarity with a faster, small-wing type using the conventional controls 21,21a,22–24. Landings and take-offs at different airspeeds may also be practiced.

Figure 9:
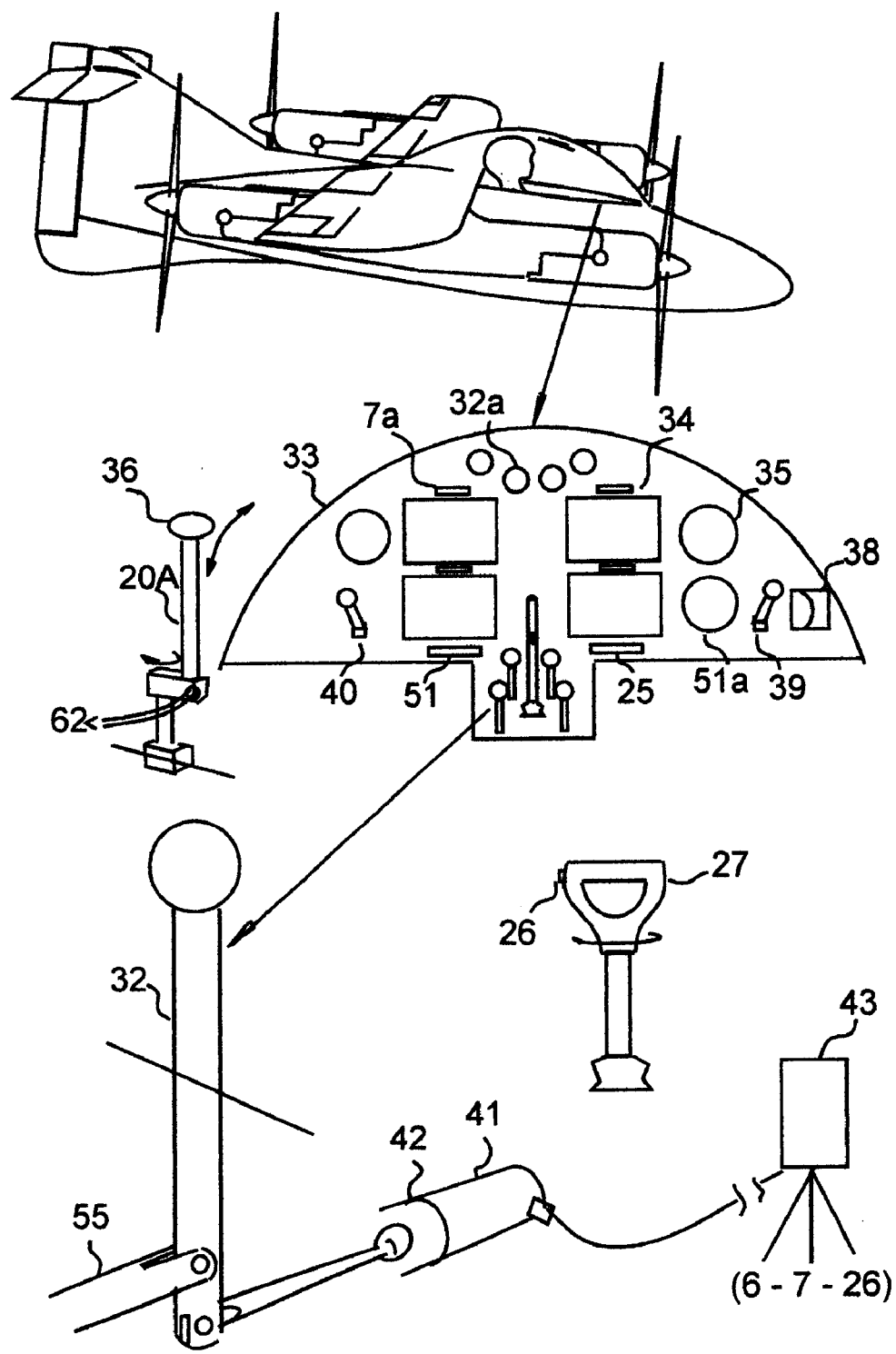
FIG. 9 is a sketch showing the cockpit layout for this embodiment.
Figure 10:
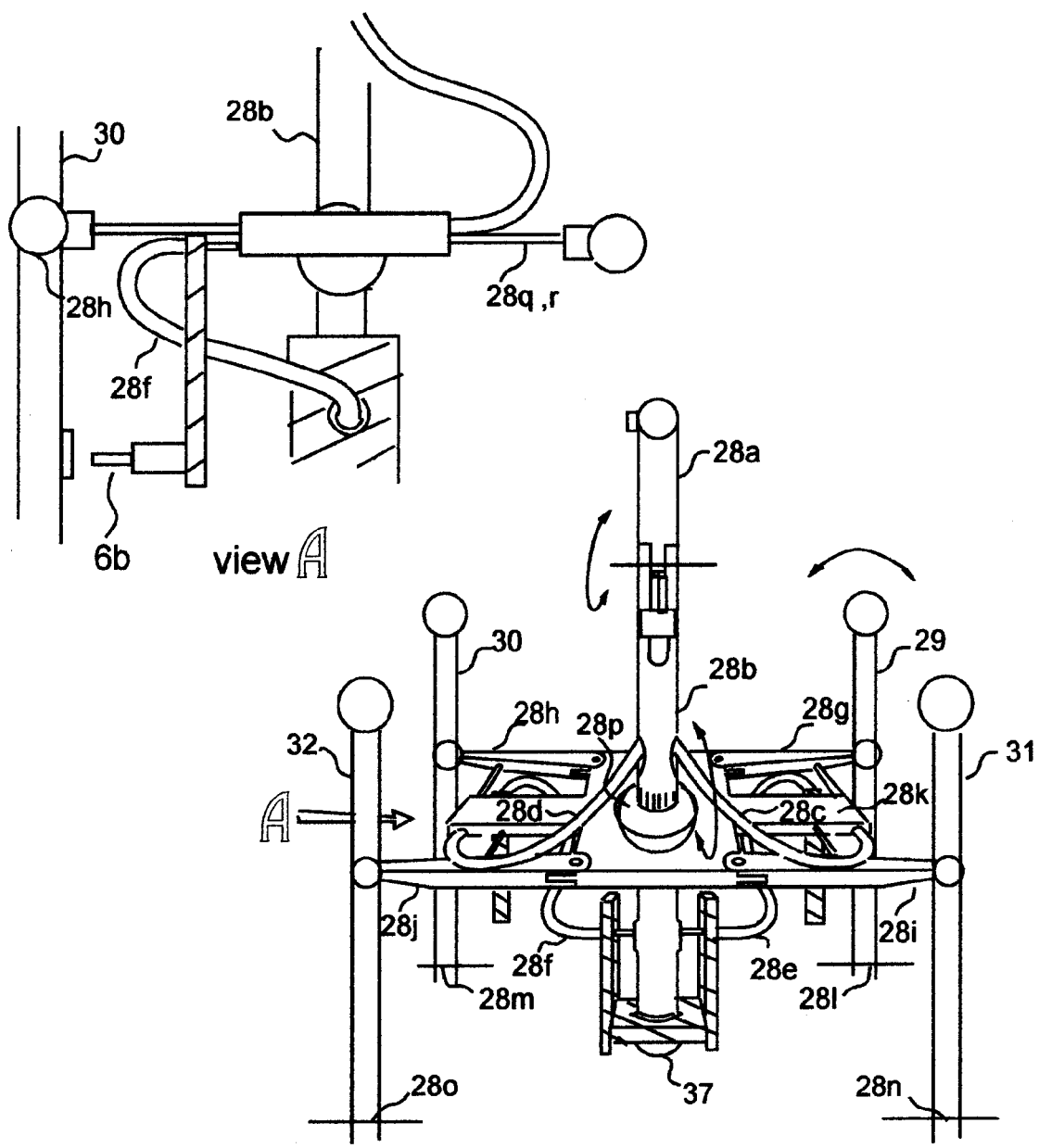
FIG. 10 is a sketch showing the hovering controls for this embodiment.

For the design illustrated, the conventional control group includes a three-axis stick 27 shown in FIG. 9 and a master throttle 28 shown in FIG. 10. The master throttle 28 operates all four engines 13–16 together. A set of four throttles 29–32 are mounted with the master throttle 28 for individual engine control (normally under automatic control in translational or hovering flight).

The master throttle 28 acts as a three-axis stick in hovering flight and an example for a manual low cost arrangement is shown in FIG. 10. The master throttle lever is articulated to allow the top part be moved forward and backward as the lower part is held stationary and conversely the lower part may be moved forward and backward while the upper part does not move in relation to the lower part. The upper part 28a of the master throttle 28 is connected to the forward engine throttles 29,30 by Bowden type cables 28c,d through hinged arms 28g,h.

To decrease power on the forward engines the upper part 28a is moved forward, lowering the nose of the aircraft. To increase power on the forward engines the upper part 28a is moved rearward raising the nose of the aircraft. The lower part 28b of the master throttle 28 is set at its base in a universal mount 33 to provide sideways as well as forward movement. The lower part 28b holds a carriage 28k on a flexible sliding joint 28p at its mid-point. The carriage 28k is supported on four laterally disposed hinged arms 28g,h,i,j attached at the outer part to the mid points of the four throttles 29–32 mounted to have normal fore-aft operation but each seated in a base 281,m,n,o having lateral flexibility with means for self centering.

This lateral flexibility allows sideways movement of the master throttle to drive Bowden type cables 28e,f and cause the carriage 28k to rotate about its vertical axis. Note rods 28q,r are for synchronizing forward and aft engines.

Movement of the master throttle to starboard twists plate 28k increasing power to port engines 14,16 and decreasing power to the starboard engines 13,15, lowering the starboard wing. Movement of the master throttle to port raises the starboard wing. Manual throttles or their actuators, control emergency electric power via overmax switch systems 6a–d which are part of the auto-landing system.

In FIGS. 9–10 the tilt control column 20a is at the left and is pulled backwards to tilt the motors upward, little manual force is required, lock is automatic. The flaps are linked for slow initial movement and faster final movement. In FIGS. 3–8 a set of footbars 20b are used for differential tilt control. The movement is restricted through the limiting system 20g since the turning couple of the asymmetrically tilted rotors is quite large and, in hover, the vertical thrust would be reduced by excessive differential tilt. If cyclic pitch is fitted for larger propellers 17i–l, the autopilot can apply differential tilt using cyclic.

Figure 19:
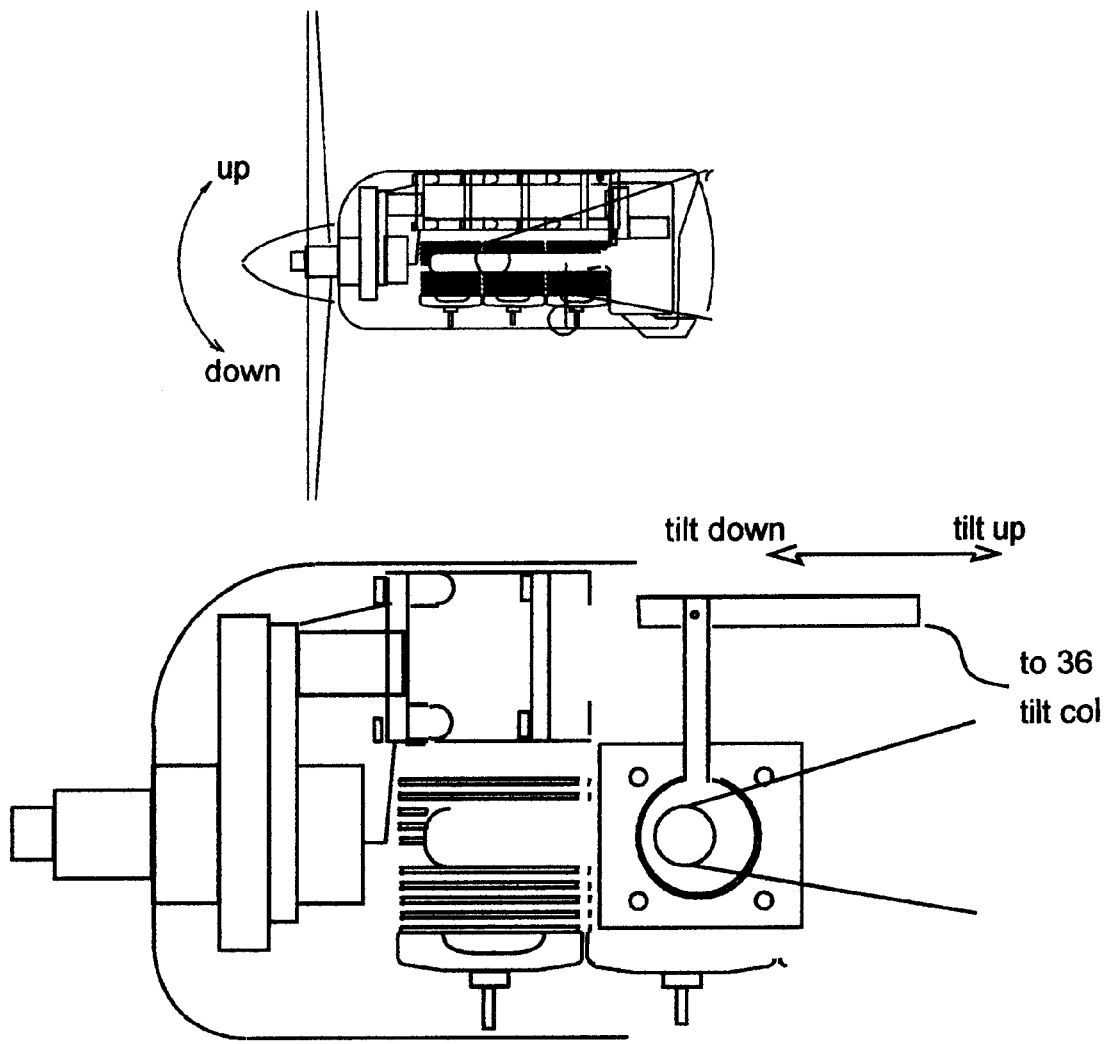
FIG. 19 is a sketch showing the trunnion cam arrangement.
Figure 22A:
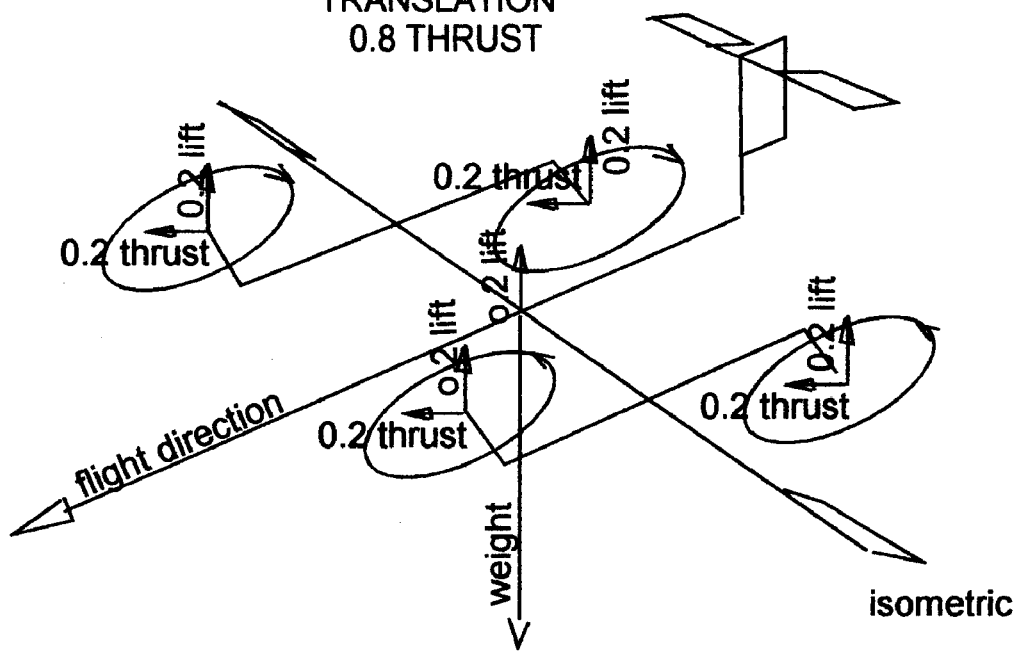
FIG. 22 is a diagram of forces for translational flight.
Figure 22B:
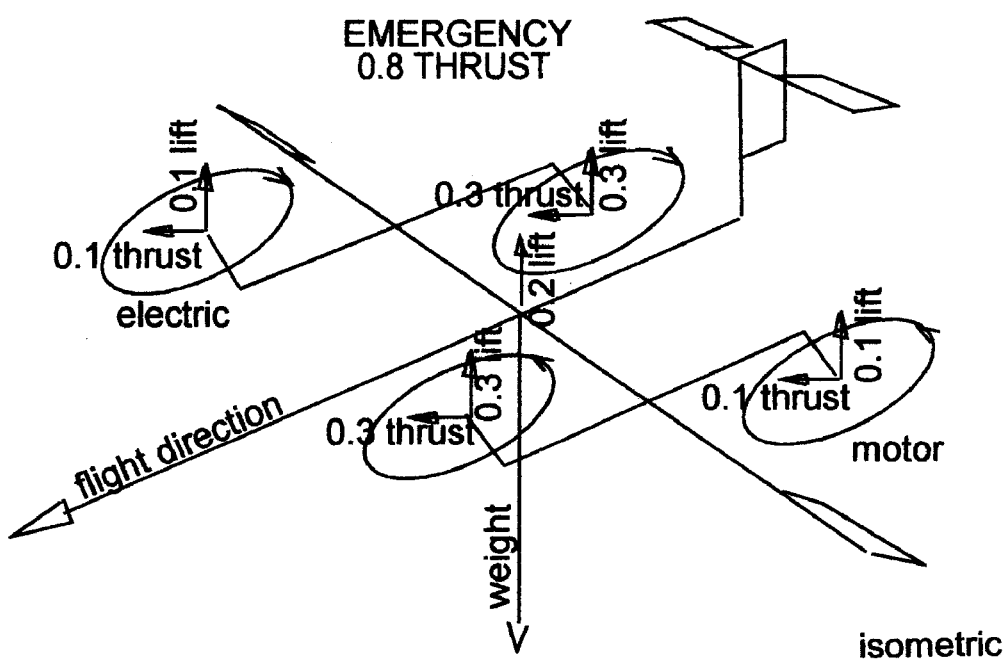

The manual variable pitch control 38, is normally managed by the automatic landing system which controls attitude in translational and hovering flight. When landing in the conventional aircraft mode a lever 39 marked 'thrust reverse' reduces the propeller pitch, and is applied at the discretion of the pilot Tilting force may also be applied by offsetting the engine trunnion centres by cam 62 action per FIG. 19. Offset is applied by adjustable twist of tilt column 20a. Drag flaps 63a–d per FIG. 2 may be fitted to balance the tilt assembly drag forces.

The conventional controls are not shown on the design sketches FIGS. 3–8, an example however is given in FIG. 9 which shows the instrument panel 33 with the main HITS flight systems 34 and their primary (back-up) systems 35, together with the three axis stick 27 for normal flight, the motor tilt column 20a with locking knob 36, master throttle 28, engine throttles 29–32 and start/feather buttons 29a–32a, three-axis stick 26, variable propeller pitch lever 38, reverse thrust lever 39, gear lever 40, servo actuator system 41, sensor system 42, and throttle linkage 55. Separate three axis manual systems for normal flight and hover allow two simple autopilots to be used, directed by the navigation and landing systems.

All the controls are monitored by a permanently vigilant, power, stall, gear, or obstruction warning, optimum tilt indicating, icing alarm, gust and panic protection system 43 that supports the controls in all manual or automatic modes, slowing or halting forward flight as required. This is existing technology. Light aircraft with power failure or in poor weather, incur a risk when flying over forests, lakes, mountains and cities. Not so with the four-engine safety of the hoverplane, which can maintain altitude on only two engines and land in hover when bad weather threatens on three.

The hoverplane is stable in normal flight and in hover, and the manual system will allow the machine to be controlled at all times without the auto-pilot engaged. Care must be taken to take-off into wind just as for any airplane and some experience and skill is required. This allows the use of a simpler hoverplane in underdeveloped areas at a minimum initial cost. Note that the manual throttle system given is in principle.

Figure 11:
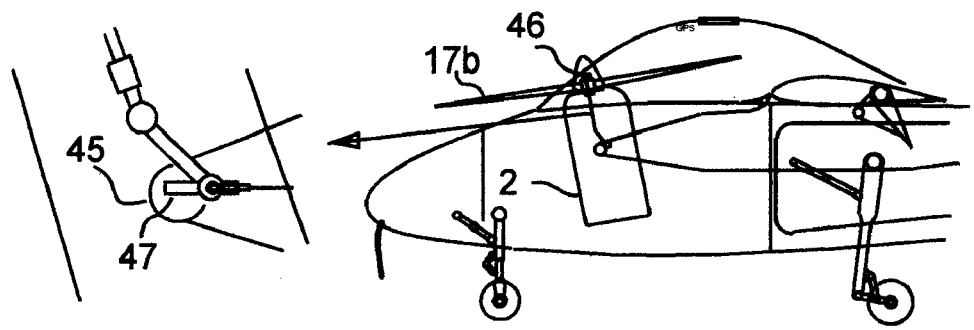
FIG. 11 is a sketch showing a second embodiment having a cam operated variable pitch control for the propellers.

In the simpler embodiment, the correct pitch for translation and hover is obtained by coupling the propeller pitch control to the engine nacelle as shown in FIG. 11. An offset arm or cam system 45 is connected to the spider 46 on the propeller, changing pitch as speed is reduced and the engines tilted. For the tailless design FIG. 15 the cam 45 or other pitch control has no action for +−5 deg of tilt to permit free canard control. The reverse thrust slot 47 allows movement for further lowering pitch in order to reverse thrust.

Furthermore in the simpler embodiment it is possible to tilt the engines, extend flaps and lower gear (if not fixed) as the stall speed approaches, by aerodynamic means, providing precautions are taken to counter icing and dirt problems. Below translation speed the nose gear door 48 can be opened by spring force, and above translation speed can be closed by aerodynamic force locking the gear up and the tiltmotors in the horizontal flight position through a locking system 49.

For the preferred embodiment the nose gear door 48 opens to operate the cockpit warning system 51 and provide an audible and visual signal indicating the approach of the stall speed. A complete speech control system 51a under the automatic landing system 6 can then be implemented for the hover mode.

Figure 12:
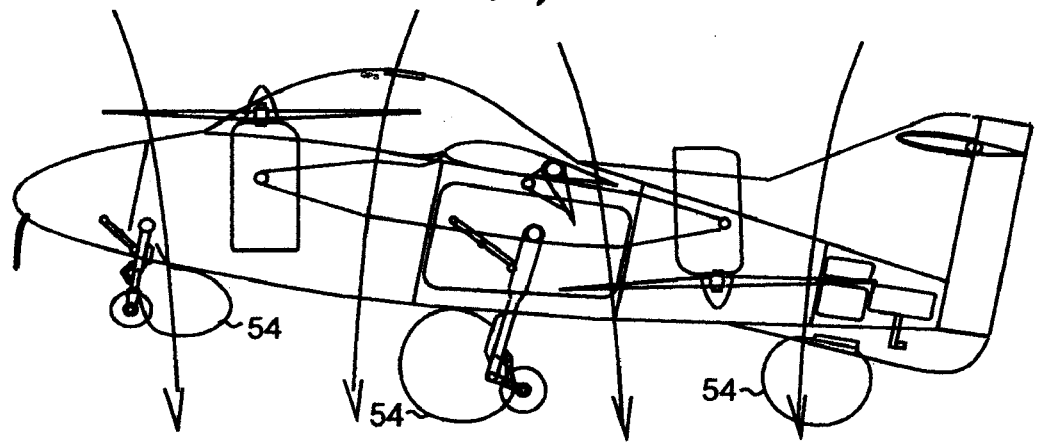
FIG. 12 is a simplified elevation from the port side showing a nose up hovering position.

The most efficient method of hovering is with the nose up 10 deg. as shown in FIG. 12. Assuming no wind, this will maintain the aircraft in a stationary position with a good view all round. If there is a wind, power is applied to the rear engines tilting the whole aircraft forward by advancing the master throttle 28a, until a stationary hover is obtained. Height may be trimmed with the master throttle 28b and heading may be allowed to weathercock into wind or held crosswind. To hold position in a crosswind the rule is to lower the windward wing by moving the master throttle 28a,b to windward and decrease tilt on that side by pushing forward on the leeward footbar 20b. This exerts a turning force to counteract the weathercocking effect. With the auto-landing system 6 set the above procedures are performed automatically, the aircraft will weathercock into wind and a heading may then be set if required, when the auto-landing system 6 will induce any drift required to counteract wind direction changes.

For take-off the auto-landing system 6 uses output from landing gear mounted sensors 52 to set the correct heading, tilt and power settings for no drift before allowing or applying take-off power, the steerable nosewheel 53 is set at 90 deg momentarily. This is done automatically unless manual control is selected. The long gear legs on the hoverplane are an essential feature of the design, allowing ground maneuvers and, with optional inflatable balloons 54 on the legs, emergency water landings. Fixed gear is cheaper but requires more skill.

The preferred embodiment used to illustrate the hoverplane can be modified to receive different propellers and engines. It is crucial to maintain small size, low weight and cost to keep performance parameters within the boundaries for a personal aircraft. If the propeller size is increased it affects the noise/nuisance levels and a very quiet arrangement is to have small gas turbines, well buried, with large slow propellers. This compromises the design but provides compressor air for emergency control if electric motors are not fitted.

Figure 13:
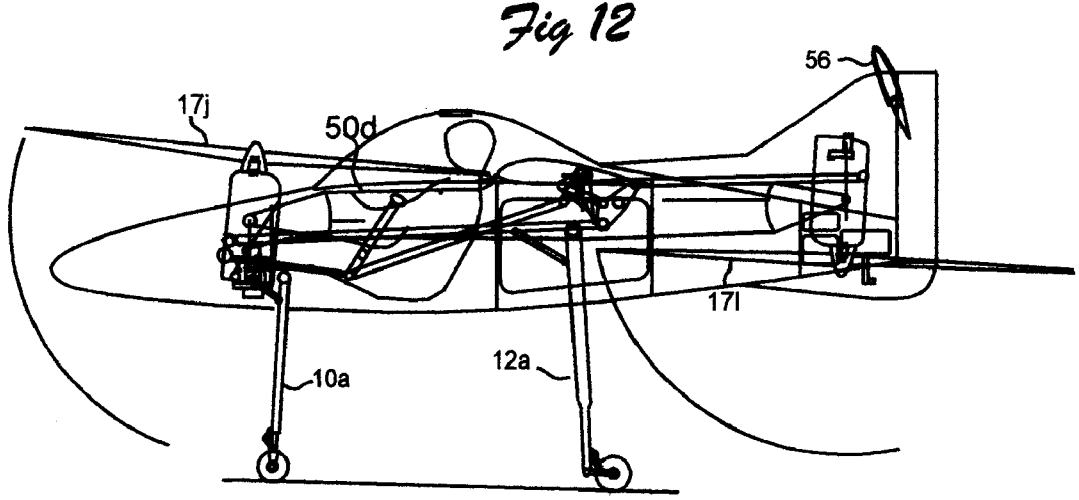
FIG. 13 is a simplified elevation from the port side of a third embodiment having propellers twice the size of the preferred embodiment.
Figure 15:
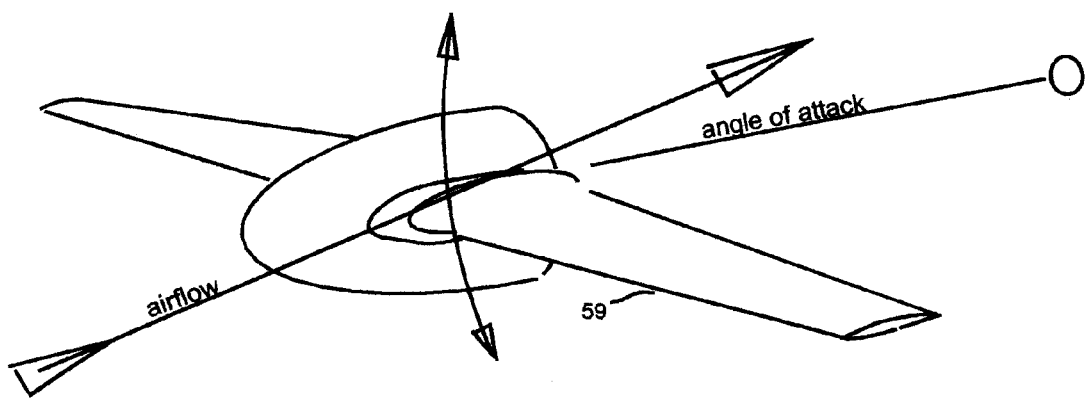
FIG. 15 is a sketch showing a propeller system with zero twist
Figure 16:
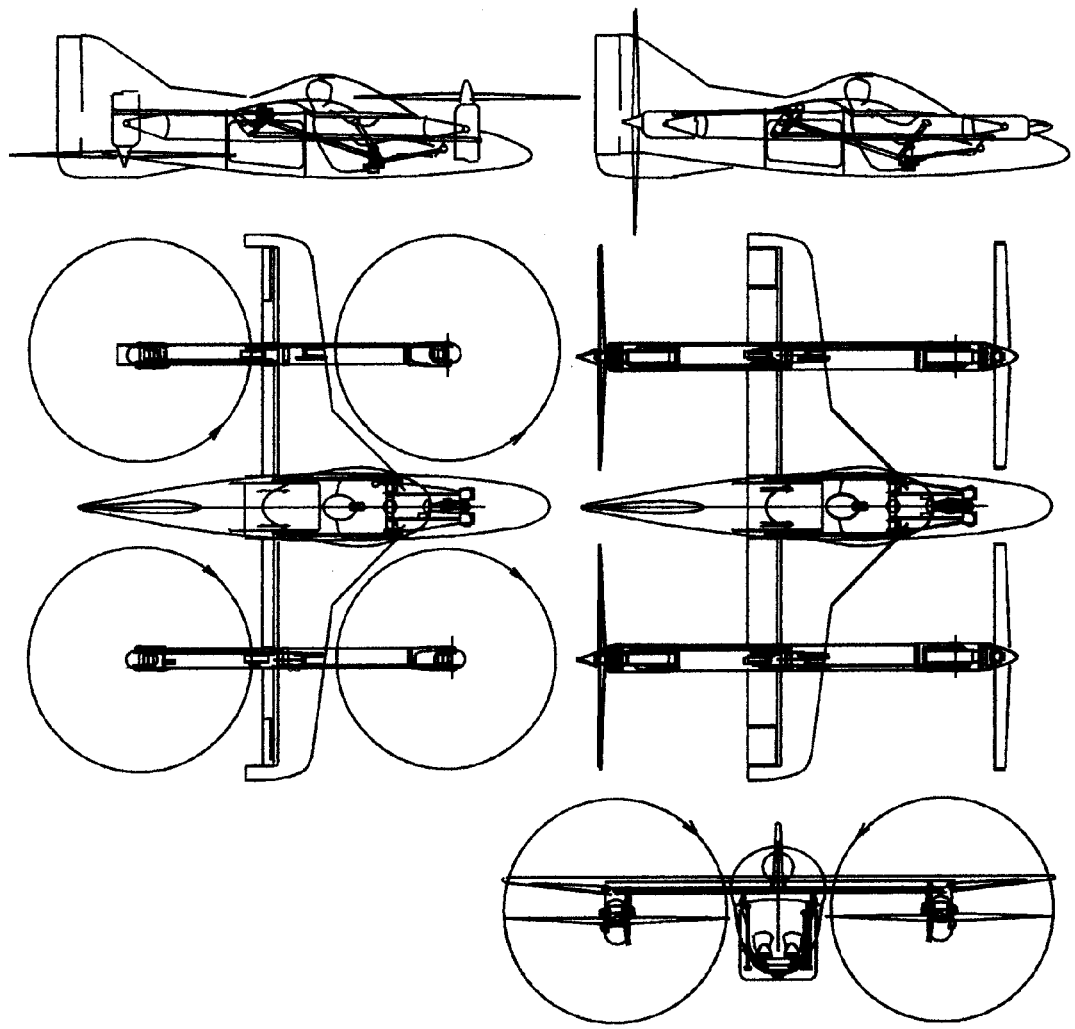
FIG. 16 is a group of layouts showing a fourth embodiment having forward rotors with zero twist for a tailless version

The small size of a 40 kw wankel engine would allow slim nacelles 49a,50a with reduced drag in hover, see FIG. 13. However increased length of the nacelles 50c,d for 2m propellers 17i–l, poses strength, resonance, cost, landing gear 10a,11a,12a size and weight problems. Also an all moving tail 56 may be needed. FIGS. 15, 16 show a tailless embodiment 60 with compromise 1.6 m diameter propellers. The forward propellers 59 are untwisted and feather as canard controls, varying tilt for climb and dive, and assymetric tilt to turn, so solving the weight and tail problems. Removal of the tailplane and fin tend to move the CG forward, this is beneficial since the tailless design will be balanced close to the leading edge.

Figure 18:
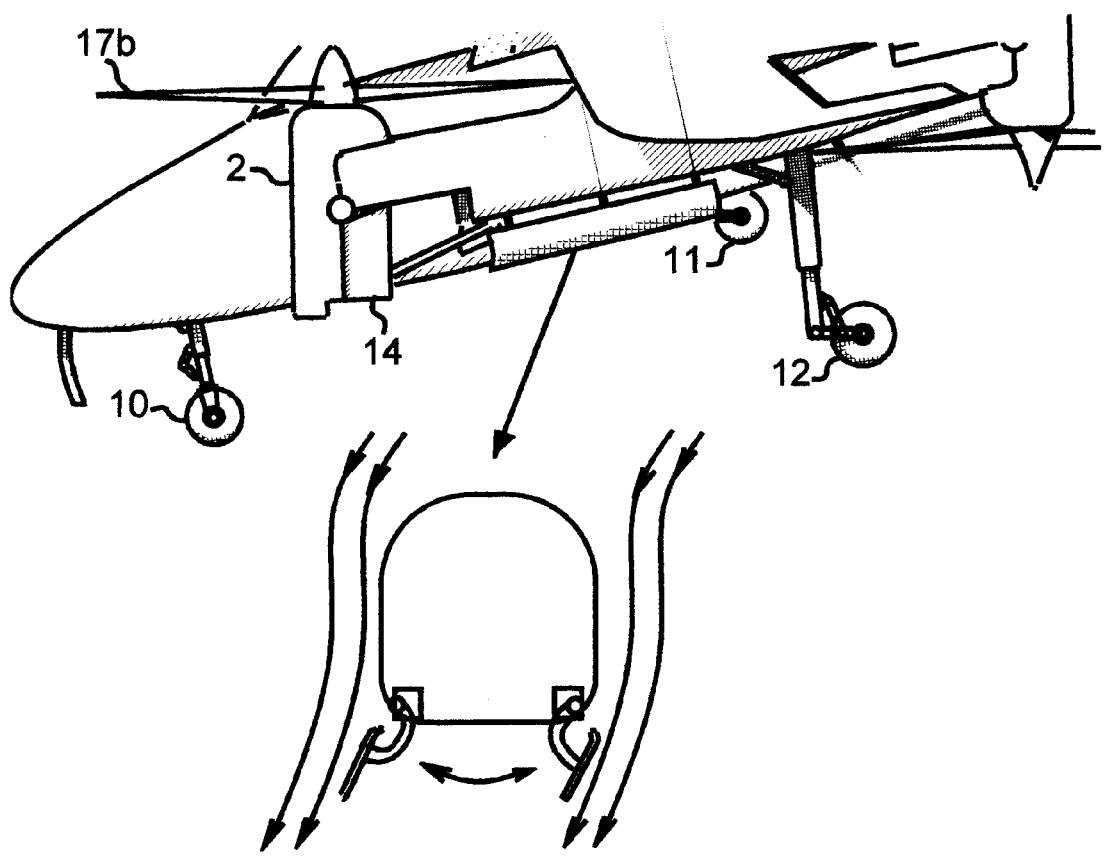
FIG. 18 is a sketch showing slipstream deflectors for improved lateral control in hover.

In horizontal flight with the forward propeller blades locked horizontal, the aircraft must obey the canard requirement that the canards stall first. This is not difficult to achieve since the thin symmetrical type blades have a much lower stalling angle than the wing, the canards will simply allow a more efficient design, the main difference with the 1.6 m propellers is reduced noise, a 4 m span, an estimated 500 kg mass and greater torsional flexibility of the nacelles, which provides more effective cyclic pitch reactions in lateral maneuvres, provided proper design to avoid instabilities. In normal flight on four motors with regular propellers this design is more efficient because of the increased propeller spacing. Using crab deflectors 61 under the nacelles also improves lateral maneuvres, these could be the landing gear doors. The arrangement is shown in FIG. 18, these items were not included in the preferred embodiment since lateral agility is excellent.

In other embodiments, either the preferred or tailless designs may be made with fly-by-wire type systems having separate actuators and sensors for each control and no manual system of physical interconnection. Powerful future control systems may be of this type and have sophisticated programs to allow special maneuvres such as steep descent with maximum flap and the motors at zero tilt in windmill. Note however that the manual control rods 20e,f allow cancellation of the aerodynamic and gyroscopic forces acting on the control system in translation and hover, note also the emergency power system maintains this under power loss.

For the canard design slight independent tilt of the forward engines could assist control while flying horizontally on four engines, though this is hardly necessary since canards equipped with flaperons are easily controlled and the hoverplane already has the advantage of the flap which is a built-in adjustable aft wing section allowing optimisation of the wing configuration for loiter, cruise and high speed (when suitable ~30% twist forward propellers are fitted). With the no twist forward propellers an ideal arrangement would be a hybrid power system with forward electric motors each with a battery or a small fuel cell. If a fuel cell is used the rear engines would be started first to provide heat for the fuel cells. A particular advantage of a forward electric motor is the opportunity to improve the nacelle contour and maintain laminar flow.

Smaller propellers can be used by increasing the number of blades, with reduced efficiency, more complexity and increased drag when feathered in tilt. The preferred embodiment with a very small diameter blade incurs less feathering drag penalty if multiple blades are used in moderate tilt, and a three bladed propeller is practical. The vertical stop feature would then be unnecessary, saving cost and increasing the reliability of the propeller systems. The very small propeller (typically 1.0–1.2 m) is safer since there is less frontal area presented to birds and airborne objects, also the aircraft ground footprint represents a smaller danger area.

Other Uses

The preferred embodiment illustrated by the example design shown in the drawings is for a manned aircraft. Other embodiments may include surveillance, search and rescue or robotic mission versions, carrying cameras, scientific equipment or gravimeters.

The example design less pilot and cockpit, would be suitable for robotic sampling and testing of the environment. The aircraft as in the preferred embodiment is small enough and agile enough to access forest, mountain, lake and ocean sites for sampling duties. The ability to travel far economically and then land or hover close to water, lava, snow and mud allows the use of probes in a manner that other surveillance machines are unable to duplicate. There is no reason why the probes should not extend forty feet with modern lightweight materials thus reducing downdraft effects, The hoverplane has the great advantage of being able to provide a steady, almost rigid base for the probe, which can be directed to move instruments in a precise manner. The small helicopter with its flexibly mounted rotor is less precise.

Alternatively, winch sampling methods can be used when hovering over high waves, volcanoes, forest fires and other dangerous areas.

Many of the earth's most valuable waters and territories are under scrutiny from space but are not examined closely with regard to insects, bacteria and poisonous substances lying beneath the surface. Spacecraft are not available immediately to provide visual data unless their orbits and current weather conditions allow but the hoverplane can plough through foul weather by reducing speed safely and permit observation and sampling over long distances for most days in the year, much more cheaply than a group of satellites.

The preferred embodiment modified to suit a sampling role becomes itself a robot and would be an ideal subject for the development of the robotic arts. With the ability to land almost anywhere, the hoverplane fitted with artificial arms would allow a beginning to be made in the difficult robotic task of remotely monitored emergency surgery, setting of fractures, injections for pain relief, resuscitation and diagnostics. Organ harvesting is another medical use.

Figure 14:
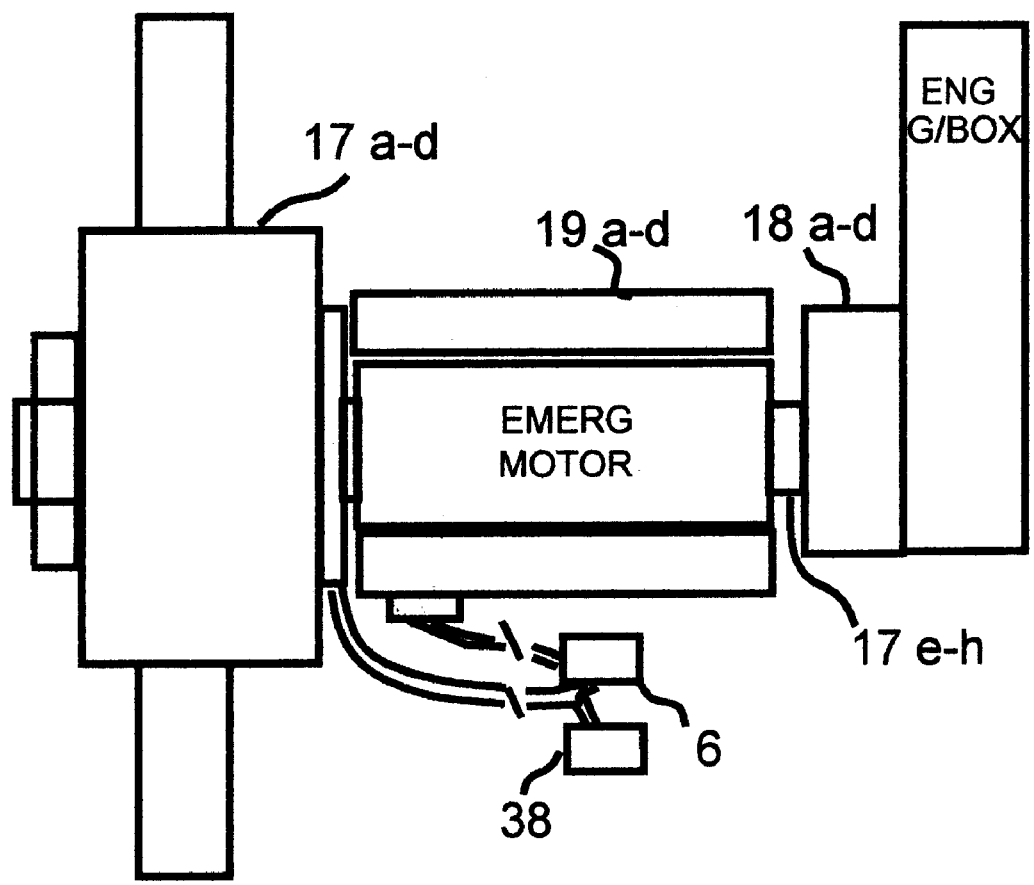
FIG. 14 is a sketch of a refuelling beacon and support system.

However the most important robotic function would be to allow the flying robot to refuel itself at any suitable gas station. A special control beacon cum mini-weather station 57 that monitors a local landing procedure under visual-telephone support 58 is practical. See FIG. 14.

A robot hoverplane gunship would have a similar appearance to the UAV version shown and is equipped with cyclic propellers and a fast six axis inertial system. The steady platform provided would not only improve the precision of fire but control recoil effects to provide more accurate fire in different directions as in following a moving target. A miniaturized electric hoverplane firing tranquilizer darts would have great accuracy and disturb wild animals less than a helicopter.

The mounting threat of terrorist activities and organized crime on a world-wide basis commands the need for more flexible but less expensive aircraft to supplement the helicopter in risk situations. The development of an aerial robot for counter terrorist work in the form of a hoverplane could be viable, especially in the event of plague attacks when the hoverplane could deliver antidotes with a minimum risk of contamination.

Without a pilot the hoverplane is lighter and more maneuverable, and with GPS and other navigational aids would permit programmed wide formation searches with nap of the earth flight techniques, even over mountainous regions. The low cost of a search and rescue hoverplane using satellite image transmission would allow the use of formation search procedures which are much more effective.

The pace of the search may be varied and search patterns changed as situations develop. For search over water liferafts and beacons may be carried, over land food, clothing and communications equipment. If a larger hoverplane is used, say with small gas turbines in the 70 kw class which are now available, then rescue of humans is possible using a winch system. a hoverplane in this category would be the ideal shipborne surveillance vehicle or decoy instrument. See FIG. 18 for lateral displacement device.

Control Basis

The traditional flight control of an ordinary personal aircraft is effected by column, wheel and rudder bar or simply stick and rudder, with throttle used for climb or descent. If the aircraft is a hoverplane only the throttle plus the tilt controls are useful in hovering flight, the stick and rudder become effective gradually as forward speed is increased. Therefore two control systems A and B are needed, A for forward flight and B for hover.

The method of application has three possibilities, use similar controls such as stick and rudder for both modes A and B, use different controls such as stick and rudder for A and a separate column with three axis stick/wheel for B or use a speech directed computer system with no manual controls C. The preferred embodiment incorporates all three control systems A comprising the tilt column 34 plus the master throttle 28, B the three axis stick, and C the autopilot/nav/landing system directed under the speech control system 51*a*.

Air traffic control and navigation control which are now oriented toward the NASA supported Highway In The Sky or HITS system using modern satellite and communications equipment are so precise that landing and take-off maneuvres can be performed autonomously. The aircraft performance characteristics such as speed and height limitations for navigation must be communicated in some form to control and air traffic instructions received, we will call this control system D.

Three kinds of propeller systems are used, Set 1 for use with variable pitch constant speed propellers Set 2 for cyclic pitch systems and Set 3 for the simple cam operated variable pitch control. Set 1 and 2 have automatic synchronization, Set 3 has manual synchronization. Set 1 is used for the preferred embodiment.

A 1 m propeller with fast thrust response to throttle changes and synchronization follow-up is sufficient to satisfy aircraft maneuver quality demands for hover, and the balanced engines and 'inboard blade down' rotation balancing gyroscopic forces, allows adequate response to tilt commands. Note an 'outboard blade down' system with reversed engine rotations and cant is possible.

Manual—Modes A, B, D

| Select Stage | Takeoff | Translate 100–150 kph | Cruise 300 kph | loiter 180 kph | Landing |
|---|---|---|---|---|---|
| Prop. pitch | Lever 39 up 10 deg | down to 20 deg | down to 30 deg | up to 20 deg | up to 10 deg |
| Master throttle | Lever 28b fwd | back to 100% t/o. | back to 75% t/o | fwd to 80% t/o | fwd to 90% t/o |
| Indiv. throttles | Lever 29–32 | follow master | follow master | close 31, 32 and feather | as master unfeather start 31, 32 |
| Starters | Switch 29a–32a on | | | | |
| Tilt control | column 20a 80 deg | fwd to 30 deg. | fwd to zero tilt | back to 10 deg. | back to 95 deg as req to w/cock |
| Assym. tilt | L/R Pedal 20b As req | | | | |
| Radio | communication functions. In emergency, engine failure and feathering signals are followed | | | | |

Automatic—Modes C, D

| | | |
|---|---|---|
| Autopilot syst. | Button 26a–c on at t/o | (stick or auto-feather throttle in loiter range overide) |
| Autonav. syst. | Switch 7a on set co-ord's | point to point via control sectors |
| Autoland syst. | Switch 6 on set wind d/s | take-off and land at initial and final points tilt, landing gear and propeller settings per feedback status and current task program |
| Speech control system | button 51a on | provides alternate command of all systems whenever required and radio communication |

In emergency, feathering or emergency power management is automatic under the speech control system.

Note on Descents

The preferred embodiment with manual back-up controls is designed so that in hover the normal-flight ailerons are not used for lateral control about the longitudinal axis, instead the master throttle is moved sideways to provide differential vertical thrust from the propellers.

To avoid unwanted accelleration in descent the motors are tilted while the airspeed is low, and the flaps which are interconnected through the tilt mechanism are deployed and the descent begun. Because the aircraft is now in the hover configuration the master throttle must be used for lateral control.

If the aileron control is used under these conditions only a slight undesired adverse yaw will result instead of the expected lowering or raising of the wing. As part of the warning system a voice advice and a warning light are given when the flaps are down above the stall speed. If the autopilot control system is selected, aileron control is effected through throttle control. as appropriate to the airspeed and flight regime. The rudder and aileron operate as normally until below the stall, when the pull out is complete and transitional flight begins.

For this and for rapid response to engine failure, an automatic system was included in the preferred embodiment specifications and it is intended that most of the flight should be under automatic control. However this is not to mean that manual control cannot be maintained in all circumstances, with proper training and a full understanding of the manual system, a low cost manual machine is entirely valid. A training tip having a conventional aileron is used to make transition to the type easier, it provides additional aileron control in descent. The training tip is used in mountainous territory also, when speed is not a premium but frequent descents may be required. The flying wing design of FIG. 16 shows this type of tip.

The guiding principle here is that the handling of the vehicle on the airborne route must at least match the safety and surety of an automobile on a conventional road. This is in line with the NASA recommendations under the HITS program.

The embodiments of the invention in which an exclusive property or privilege is claimed are defined as follows:

1. A VTOL tiltmotor aircraft, comprising a fuselage having a forward cockpit set directly in front of a shoulder mounted wing, a conventional rearward tail with fin and rudder and having a high set tailplane and elevators, large flaps mounted on said wing usable as dive brakes and having means to effect their deployment in synchronization with motor tilt, two nacelles mounted on said wing, one to port and the other to starboard each with a forward motor tiltable up beyond the vertical through an arc greater than ninety degrees and an aft motor tiltable downward beyond the vertical through an arc greater than ninety degrees such as to permit a nose down flight attitude with propeller discs horizontal, an electric motor fitted to each engine to provide emergency power with means to unfeather said propellers and disengage them via a clutch mechanism from any failed engine as emergency power is applied, and means under autopilot or manual control to maintain the center of lift, said propellers being variable pitch fully feathering and thrust reversing and having means for their control and means to stop with blades vertical when feathered in horizontal or translational flight.

2. An aircraft as defined in claim 1, having long rear landing gear legs with means for their extension and retraction into said nacelles providing ground clearance for the said propellers and a retractable steerable nosewheel, all with provision for flotation equipment and having means to detect weathercock forces and allow or direct the aircraft to swing automatically into wind while on the ground using asymmetric tilt or power or steering, and having the tilt axes of the said engines inclined about the fore and aft axis of said nacelles providing sideways tilt of the said propellers to reduce uneven wear and hub loads in loiter or transitional flight.

3. An aircraft as defined in claim 1 or 2, in which the said propellers have their pitch automatically set as the tilt angle of the said motors are varied, by means of offset arms or cams secured to the nacelle, which arms or cams drive a control linkage system to the pitch changing mechanism.

4. An aircraft as defined in any of claims 1 or 2, in which a manually operated tilt and yaw system for hover and translational flight has a cockpit control lever mounted on a swinging platform, which is connected by linkages to the flaps and tiltmotors such that their angles of deflection are synchronized, equipped with means to lock the lever, flaps and tiltmotors in their selected position upon release, and having a rudder bar type control with limited action connected to the said swinging platform in order to effect asymmetric tilt of said motors and provide yaw control of the aircraft.

5. An aircraft as defined in any of claims 1 or 2, having a low cost manual throttle system that simplifies control of the throttles for attitude changes in transitional flight and hover, by use of an articulated master throttle linked to the engine throttles so that the upper section controls fore and aft attitude, sideways movement controls lateral bank attitude and movement of the lower section increases power simultaneously to all of the said engines for altitude changes.

6. An aircraft as defined in any of claims 1 or 2, of tailless design having zero or low twist forward propellers with means to feather and stop horizontally and act as canards in level flight controlling climb or dive by changing motor tilt to alter the canard incidence, or turn port or starboard by using assymetric motor tilt, and having optional electric forward primary engines.

7. An aircraft as defined in any of claims 1 or 2 having cyclic pitch propellers and six axis inertia sensors at or near each engine trunnion support with means to apply for tiltmotor control, flight control, and external force reaction control for both full size and miniaturised versions.

8. An aircraft as defined in any of claims 1 or 2 having a fixed undercarriage or skids.

9. An aircraft as defined in any of claims 1 or 2 having a remotely operable refuelling probe, sampling probe, tranquilizer dart gun or other such projectile device and means for its manipulation and operation, and having a remote camera aiming system with means for either cockpit or remote operation.

10. An aircraft as defined in any of claims 1 or 2 having slipstream deflectors under the nacelles with means for their action in combination with a master throttle or hovering controls, to provide lateral displacements of the aircraft in hover.

11. An aircraft as defined in any of claims 1 or 2 having drag flaps attached to the nacelles in order to balance aerodynamic tilt forces.

12. An aircraft as defined in any of claims 1 or 2 having a moveable trunnion mount for the engines operated by a cam so that the thrust line is changed, and having the cam operating lever connected to the tilt control column so that offset thrust is applied to assist motor tilt.

* * * * *